US007009666B2

(12) United States Patent
Khan et al.

(10) Patent No.: US 7,009,666 B2
(45) Date of Patent: Mar. 7, 2006

(54) BACK LIT CHOLESTERIC LIQUID CRYSTAL DISPLAY

(75) Inventors: Asad A. Khan, Kent, OH (US); Michael E. Stefanov, Stormville, NY (US); Clive Catchpole, Birmingham, MI (US)

(73) Assignee: Kent Displays Incorporated, Kent, OH (US)

( * ) Notice: Subject to any disclaimer, the term of this patent is extended or adjusted under 35 U.S.C. 154(b) by 261 days.

(21) Appl. No.: 09/961,441

(22) Filed: Sep. 24, 2001

(65) Prior Publication Data

US 2002/0030776 A1 Mar. 14, 2002

Related U.S. Application Data

(63) Continuation-in-part of application No. 09/378,830, filed on Aug. 23, 1999, now Pat. No. 6,532,052.

(51) Int. Cl.
  G02F 1/1335 (2006.01)
  G02F 1/1333 (2006.01)
  G02F 1/01 (2006.01)
  G02F 21/00 (2006.01)

(52) U.S. Cl. .......................... 349/96; 349/88; 250/225; 438/30

(58) Field of Classification Search .................. 349/96, 349/68; 250/225; 438/30
  See application file for complete search history.

(56) References Cited

U.S. PATENT DOCUMENTS

| 4,097,127 A |   | 6/1978  | Haas et al.    |
|-------------|---|---------|----------------|
| 4,398,805 A | * | 8/1983  | Cole           |
| 5,146,355 A | * | 9/1992  | Prince et al.  |
| 5,251,048 A |   | 10/1993 | Doane et al.   |
| 5,384,067 A |   | 1/1995  | Doane et al.   |
| 5,437,811 A |   | 8/1995  | Doane et al.   |
| 5,453,863 A |   | 9/1995  | West et al.    |
| 5,608,553 A |   | 3/1997  | Kim            |
| 5,644,330 A |   | 7/1997  | Catchpole et al. |
| 5,673,128 A |   | 9/1997  | Ohta et al.    |
| 5,677,746 A |   | 10/1997 | Yano           |
| 5,691,795 A |   | 11/1997 | Doane et al.   |
| 5,695,682 A |   | 12/1997 | Doane et al.   |
| 5,734,457 A | * | 3/1998  | Mitsui et al.  |
| 5,748,277 A |   | 5/1998  | Huang et al.   |
| 5,764,322 A |   | 6/1998  | Mamiya et al.  |
| 5,796,454 A |   | 8/1998  | Ma             |

(Continued)

OTHER PUBLICATIONS

A. Khan et al., P-49: *Characterization of the Helical-Axis Distribution in Reflective Cholesteric LCD's*, Proc. of SID 96, 607 (1996).

(Continued)

*Primary Examiner*—Long Pham
*Assistant Examiner*—Shrinivas H. Rao
(74) *Attorney, Agent, or Firm*—Pearne & Gordon LLP

(57) ABSTRACT

A reflective cholesteric display that may be viewed under a wide range of ambient lighting conditions, ranging from complete darkness to bright sunlight. The display includes a chiral nematic liquid crystal material located between first and second substrates, an ambidextrous or bi-directional circular polarizer, a partial mirror, also referred to as a transflector, and a light source. The liquid crystal material includes focal conic and planar textures that are stable in the absence of an electric field. The ambidextrous circular polarizer is located adjacent to one of the substrates that constrain the liquid crystal material. The chiral nematic liquid crystal display may be operated in both a transmissive mode and a reflective mode.

32 Claims, 7 Drawing Sheets

U.S. PATENT DOCUMENTS

| | | | |
|---|---|---|---|
| 5,844,540 A | | 12/1998 | Terasaki |
| 5,847,798 A | | 12/1998 | Yang et al. |
| 5,896,119 A | * | 4/1999 | Evanicky et al. ............. 345/87 |
| 5,920,368 A | | 7/1999 | Hatano et al. |
| 5,929,956 A | * | 7/1999 | Neijzen et al. |
| 5,939,840 A | | 8/1999 | Nakagawa et al. |
| 5,940,150 A | * | 8/1999 | Faris et al. |
| 5,956,113 A | | 9/1999 | Crawford |
| 5,965,874 A | * | 10/1999 | Aso et al. |
| 5,986,727 A | | 11/1999 | Fukui et al. |
| 6,023,316 A | | 2/2000 | Yano |
| 6,027,222 A | | 2/2000 | Oki et al. |
| 6,034,752 A | | 3/2000 | Khan et al. |
| 6,034,753 A | * | 3/2000 | Li et al. |
| 6,064,455 A | | 5/2000 | Kim |
| 6,104,455 A | | 8/2000 | Kashima |
| 6,122,024 A | | 9/2000 | Molsen et al. |
| 6,124,971 A | * | 9/2000 | Ouderkirk et al. |
| 6,147,724 A | | 11/2000 | Yoshii et al. |
| 6,154,262 A | | 11/2000 | Ogura |
| 6,164,790 A | | 12/2000 | Lee |
| 6,266,113 B1 | * | 7/2001 | Yamazaki et al. |
| 6,285,422 B1 | * | 9/2001 | Maeda et al. |
| 6,377,321 B1 | | 4/2002 | Khan et al. |
| 6,483,563 B1 | | 11/2002 | Khan et al. |
| 6,532,052 B1 | * | 3/2003 | Khan et al. |

OTHER PUBLICATIONS

B. Taheri et al, *5.3:Optical Properties of Bistable Cholesteric Reflective Displays*, Proc. of SID 96, 39 (1996).

X.-Y. Huang et al., *LP-1: Late-News Poster: Gray Scale of Bistable Reflective Cholesteric Displays*, Proc. of SID 98, 810 (1998).

D.-K. Yang et al., *40.1:Invited Address: Cholesteric Liquid-Crystal/Polymer-Gel Dispersions: Reflective Display Applications*, Proc. of SID 92, 759 (1992).

D.-K Yang et al., *Cholesteric Liquid Crystal/Polymer Gel Dispersion Bistable At Zero Field*, IDRC 1991, 49 (1991).

M. Schadt et al., *Surface-Induced Parallel Alignment of Liquid Crystals by Linearly Polymerized Photopolymers*, Jpn. J. Appl. Phys. vol. 3, pp. 2155-2164 (Jul. 1992).

L. Schlangen et al., *Electro-Optics of Reflective Bistable Chiral Nematic Liquid Crystal Displays: Temperature, Cellgap and Polymide Thickness Dependence*, Proc. of Asia Display 98, 123 (1998).

J. Doane et al., *S3-6 Front-Lit Flat Panel Display from Polymer Stabilized C holesteric Textures*, Japan Display '92, 73 (1992).

Makow, D.M. et al. "Additive colour properties and color gamut of cholesteric liquid crystals", Nature 276, 48-50 (1978).

Liquid Crystals—Applications and Uses (vol. 3), pp. 21-63, World Scientific Publishing Co., Pte. Ltd. (1992).

Liquid Crystals—Applications and Uses (vol. 1), pp. 171-194, World Scientific Publishing Co., Pte. Ltd. (1990).

Liquid Crystals—Applications and Uses (vol. 1), pp. 437-491, World Scientific Publishing Co., Pte. Ltd. (1990).

Liquid Crystals—Applications and Uses (vol. 2), pp. 98-104, World Scientific Publishing Co.,, Pte. Ltd. (1991).

* cited by examiner

BACK LIT CHOLESTERIC LIQUID CRYSTAL DISPLAY

RELATED APPLICATIONS

The present application is a continuation-in-part of U.S. patent application Ser. No. 09/378,830, filed Aug. 23, 1999, entitled "Brightness Enhancement for Bistable Cholesteric Displays," now U.S. Pat. No. 6,532,052, issued Mar. 11, 2003.

FIELD OF THE INVENTION

The present invention is directed to cholesteric liquid crystal displays and, in particular, to a cholesteric liquid crystal display that may be operated in both a reflective mode or a transmissive mode.

BACKGROUND OF THE INVENTION

Liquid crystal displays have brought to the world a low-power, flat-screen technology that has enabled many new portable devices to be produced. As the demand for more portable devices grows, so does the demand for liquid crystal displays with improved performance. Reflective displays are important not only because they reduce power consumption, but also because they can be clearly seen in sunlight. Back-lit or transmissive displays are necessary when the display will be used in a poorly lighted environment.

Displays with bistable memory are attractive for reducing power consumption and increasing battery life compared to displays in which the image needs to be continuously refreshed. Bistable liquid crystal displays were developed using cholesteric liquid crystalline materials. With a low concentration polymer network or with suitably prepared substrate surfaces, both the focal-conic and planar textures of a cholesteric liquid crystal can be made stable and it is possible to electrically switch between the two states.

Cholesteric displays that employ the polymer network may use cells with rubbed substrates to achieve a homogeneous alignment of the liquid crystal at the surface of the cell substrate. Homogeneous alignment tends to favor the planar texture. The polymer network or suitably prepared substrate surface prevents the focal-conic texture from transforming to the planar texture.

Reflective cholesteric liquid crystal displays are popular for portable signs as well as hand held devices where low-power consumption and hence long battery life is important. These reflective displays are readable in bright sunlight as well as room light. Bistable cholesteric reflective liquid crystal displays are addressed in two states, the reflecting planar texture and the weakly scattering focal conic texture. A black absorbing ink or paint layer is typically applied to the back substrate of the display and causes the focal conic texture to appear black, while light reflected by the planar texture is the color of its characteristic Bragg reflectance.

Under many lighting conditions back lighting is desirable over front lighting. One advantage of a back lit display is that light is more uniformly distributed over the display. In addition, back lighting sources are readily available. Prior art reflective cholesteric displays could only be front lit. U.S. Pat. No. 5,796,454 to Ma discloses one scheme that addresses back lighting. There is a need for a cholesteric liquid crystal display that can be selectively operated in a front lit mode as well as a back lit mode.

SUMMARY OF THE INVENTION

The present invention concerns a chiral nematic liquid crystal display that may be operated in both a reflective mode and a transmissive mode. The display includes a chiral nematic liquid crystal material located between first and second substrates, an ambidextrous or bi-directional circular polarizer, a partial mirror, also referred to as a transflector and a light source. A partial mirror or transflector reflects a portion of light incident on the partial mirror or transflector and transmits the remaining portion. The chiral nematic liquid crystal material includes focal conic and planar textures that are stable in the absence of an electric field. The ambidextrous circular polarizer is located adjacent to one of the substrates that bound the liquid crystal material.

The chiral nematic liquid crystal material has a circular polarization of a predetermined handedness, for example left handedness. The ambidextrous circular polarizer can include a linear polarizer located between first and second quarter wave retarders. The light source is selectively energizeable to emit light through the transflector or partial mirror and the ambidextrous circular polarizer.

When ambient lighting conditions are poor, the liquid crystal display may operate as a transmissive display. Light is emitted from the back lighting source and is passed through the transflector or partial mirror. The light is then passed through the ambidextrous circular polarizer to polarize the light with the selected circular handedness. The chiral nematic liquid crystal material is controlled to selectively exhibit the planar texture and the focal conic texture. When the liquid crystal material exhibits the focal conic texture, the circularly polarized light is passed through the liquid crystal material to exhibit a bright state. When the liquid crystal material exhibits the planar texture the circularly polarized light is reflected back towards the back light by the liquid crystal material to create a dark state. The light reflected by the liquid crystal material exhibiting the planar texture is absorbed with the ambidextrous circular polarizer.

When ambient lighting conditions are sufficient, the liquid crystal display is operated as a reflective display. The chiral nematic liquid crystal material is controlled to selectively exhibit the planar texture and the focal conic texture. When the liquid crystal material exhibits the planar texture, a portion of the incident light is reflected by the chiral nematic liquid crystal material, creating a bright state. When the liquid crystal material exhibits the focal conic texture, incident light is passed through the liquid crystal material, creating a dark state. The light passed through the liquid crystal material is then passed through the ambidextrous circular polarizer to polarize the light with the selected circular handedness. The light passed through the ambidextrous circular polarizer is reflected by the reflective side of the transflector or partial mirror. The light reflected by the transflector is absorbed by the ambidextrous circular polarizer.

In the exemplary embodiment, the intensity of the ambient light is monitored. The light source is selectively energized and de-energized in response to the intensity of the ambient light.

These and other objects, features and advantages of the invention will become better understood from the detailed description of the preferred embodiments of the invention which are described in conjunction with the accompanying drawings.

BEST MODE FOR CARRYING OUT THE INVENTION

Figure 1:
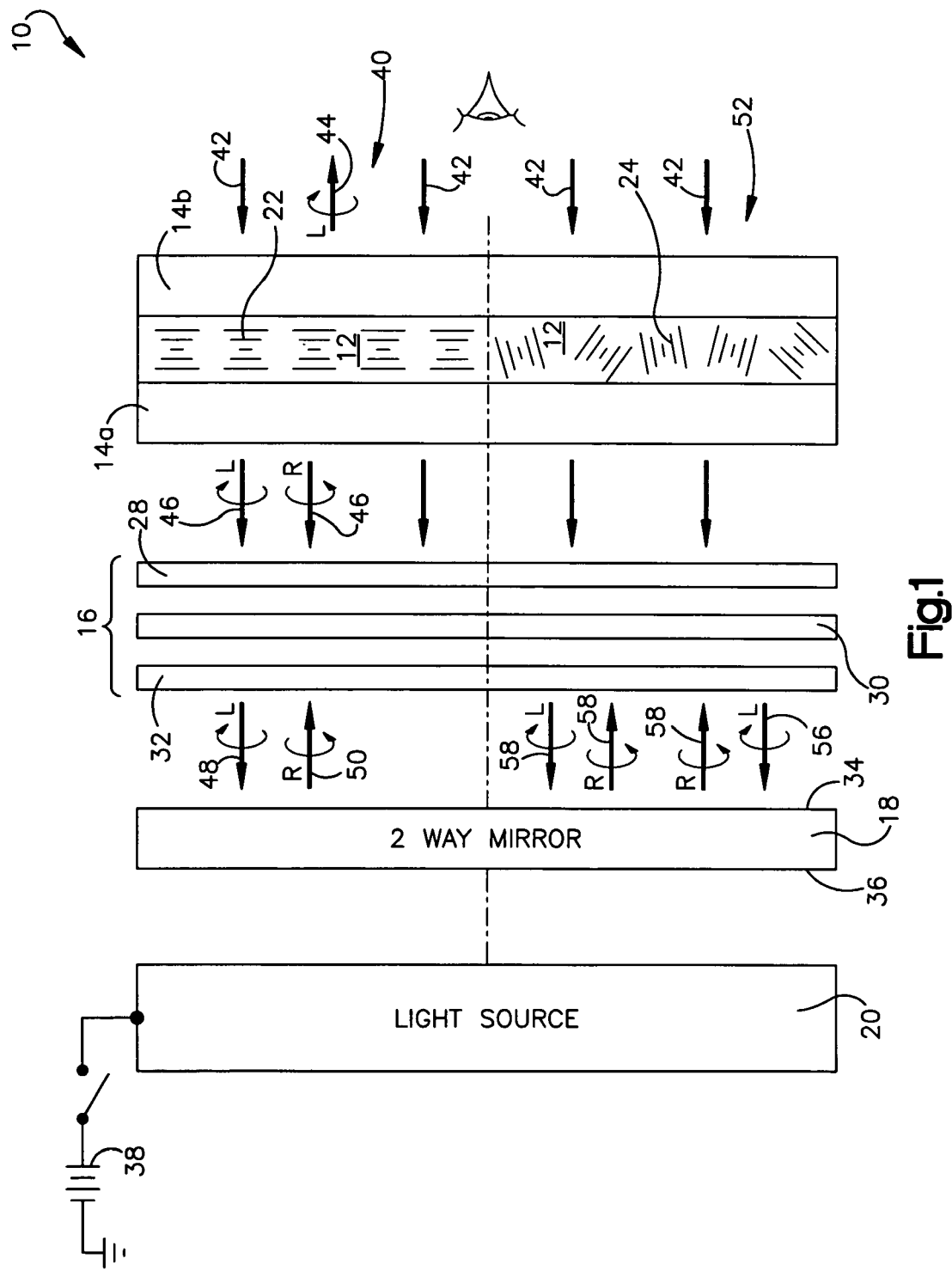
FIG. 1 is a schematic representation of the liquid crystal display of the present embodiment operating in a reflective mode.

The present invention is directed to a chiral nematic liquid crystal display 10 that may be operated in both a reflective mode and a transmissive mode. The liquid crystal display 10 includes a chiral nematic liquid crystal material 12 located between first and second substrates 14a, 14b, an ambidextrous circular polarizer 16, a partial mirror 18, also referred to as a transflector, and a light source 20.

In the exemplary embodiment, the chiral nematic liquid crystal material 12 is a bistable material that may be addressed in two states, the reflecting planar texture 22 and the weekly scattering focal conic texture 24. The focal conic and planar textures are stable in the absence of an electric field. In the illustrated embodiment, the liquid crystal material 12 is a left-handed chiral material. It should be apparent to those skilled in the art that a right-handed chiral material would work equally as well, with appropriate changes to other components of the display in view of this disclosure. In the illustrated embodiment, the planar texture has a left-handed circular polarization.

In the exemplary embodiment, one or more of the substrates 14a, 14b are rubbed to achieve a homogeneous alignment of the liquid crystal material 12 at the surface of the cell substrate. The liquid crystal material is a cholesteric material that exhibits a perfect planar texture and a focal-conic texture. The planar texture allows the display to exhibit high contrast and utilize the polarization state of light.

In the exemplary embodiment both substrates 14a, 14b of the cell are rubbed to create a perfect planar texture while maintaining the bistability of the cell. In one embodiment, a Nissan 7511 polyimide alignment layer is applied to both of the substrates and rubbed lightly to maintain the stability of the focal conic texture.

It should also be readily apparent to those skilled in the art that it may be suitable to rub only one substrate to create a bistable cell having planar textures and focal-conic textures that may be addressed.

In the exemplary embodiment, the rubbing is light, maintaining the stability of the focal-conic texture. Further details of one method of rubbing one or more of the substrates are outlined in the section styled "Rubbing Parameters" below. Further details of an appropriate method for rubbing the substrates is disclosed in U.S. patent application Ser. No. 09/378,380, entitled Brightness Enhancement For Bistable Cholesteric Displays, filed on Aug. 23, 1999, which is incorporated herein by reference, in its entirety.

In the exemplary embodiment, a voltage source momentarily is applied to the liquid crystal material 12 to create a field which causes the liquid crystal material to exhibit either the planar texture 22 or the focal conic texture 24. When the field is removed the liquid crystal material maintains the planar texture 22 or the focal conic texture 24. Details of an appropriate method for selectively causing the liquid crystal material 12 to exhibit the planar texture 22 and the focal conic texture 24 is described in U.S. Pat. No. 5,453,863 to West, issued Sep. 26, 1995, which is incorporated herein by reference.

In the exemplary embodiment, the ambidextrous circular polarizer 16 is located adjacent to one of the substrates 14a, 14b that bound the liquid crystal material 12. In the illustrated embodiment, the ambidextrous circular polarizer is a left-handed circular polarizer, corresponding to the left handed circular polarization of the planar texture. However, it should be readily apparent to those skilled in the art that a right-handed ambidextrous circular polarizer will work equally as well in combination with liquid crystal material that exhibits a planar texture having a right handed circular polarization. In the exemplary embodiment, the ambidextrous circular polarizer 16 includes a first quarter wave retarder 28, a second quarter wave retarder 32 and a linear polarizer 30 located between the two quarter wave retarders. One acceptable ambidextrous circular polarizer 16 has the same handedness as the twist sense of the cholesteric display. This type of polarizer is available from conventional polarizer suppliers, such as Nitto Denko or Polaroid.

In one embodiment, the partial mirror 18 or transflector has a reflective side 34 adjacent to the ambidextrous circular polarizer 16 and a light transmitting side 36 adjacent to the light source 20. The transflector 18 may have one side AR coated and the other side highly reflective, or it may be dielectrically stacked to achieve reflectiveness from one side of the transflector and transmissiveness from the other side of the transflector. Any mirror that transmits light from one direction and reflects light from the other direction is suitable.

In the exemplary embodiment, the transflector 18 is a polarization preserving transflector having 20% reflection and 80% transmission. A transflector having 20% reflection and 80% transmission reflects approximately 20% of the incident light and transmits approximately 80% of the incident light through the transflector. In one embodiment, the transflector reflects and transmits the same percentages of light incident on each side of the transflector. Two suitable sources of transflectors are Astra Products and Seiko Precision. Printable transflective films are available from Seiko Precision. LCD polarizer manufactures also supply transflectors as part of a polarizer, known as transflective polarizers. In one embodiment, the transflector is combined with the ambidextrous circular polarizer.

The light source 20 is selectively connected to a voltage source 38 to selectively emit light through the transflector 18. The voltage source can be an AC or a DC voltage source. An acceptable light source 20 is a thin backlight such as one used in small LCD's (electroluminescent) having an emission spectrum within a narrow wavelength range corresponding to that of the reflective cholesteric display.

FIG. 1 illustrates operation of the chiral nematic liquid crystal display being operated in a reflective mode. The top half 40 of FIG. 1 illustrates the bright state of the reflective mode. The chiral nematic liquid crystal material 12 is controlled to selectively exhibit the planar texture 22. Ambient light 42 is incident on the liquid crystal material 12. When the liquid crystal material 12 exhibits the planar texture 22 approximately 50% of the light, for example, is reflected by the liquid crystal material. The light 44 reflected by the liquid crystal material is mostly left circularly polarized. The remainder of the incident light 42 is transmitted through the liquid crystal material. The transmitted light 46 has both left-handed and right-handed components. In the illustrated embodiment, the first quarter wave retarder 28 changes the light 46 to two orthogonal linear polarization states. The two polarization states are either lined-up with a transmission axis of the polarizer or they are perpendicular to it. The components which are perpendicular to the transmission axis of the polarizer are canceled at the linear polarizer 30, while the parallel components go through the polarizer and are left circularly polarized. The left circularly polarized light 48 is reflected by the reflective side 34 of the transflector 18. Reflection by the transflector 18 changes the light 46 to right circularly polarized light 50 that gets canceled out by the second quarter wave retarder 32 and the linear polarizer 30. The net result is that substantially all of the light 46 transmitted through the liquid crystal material 12 is absorbed.

The lower half 52 of FIG. 1 illustrates the dark state of the liquid crystal display 10 being operated in a reflective mode. In the dark state, the liquid crystal material 12 is controlled to exhibit the focal conic texture 24. Ambient light 42 is transmitted through the liquid crystal in an unpolarized manner. The transmitted light 54 is left circularly polarized by the ambidextrous circular polarizer 16. The left circularly polarized light 56 is reflected by the transflector 18 turning it into right circularly polarized light 58. The right circularly polarized light 58 is absorbed by the left handed ambidextrous polarizer 16. Thus, substantially all the light transmitted through the liquid material 12 is absorbed, resulting in a dark state. This effectively serves as a back coating (e.g., black) for the display.

Figure 2:
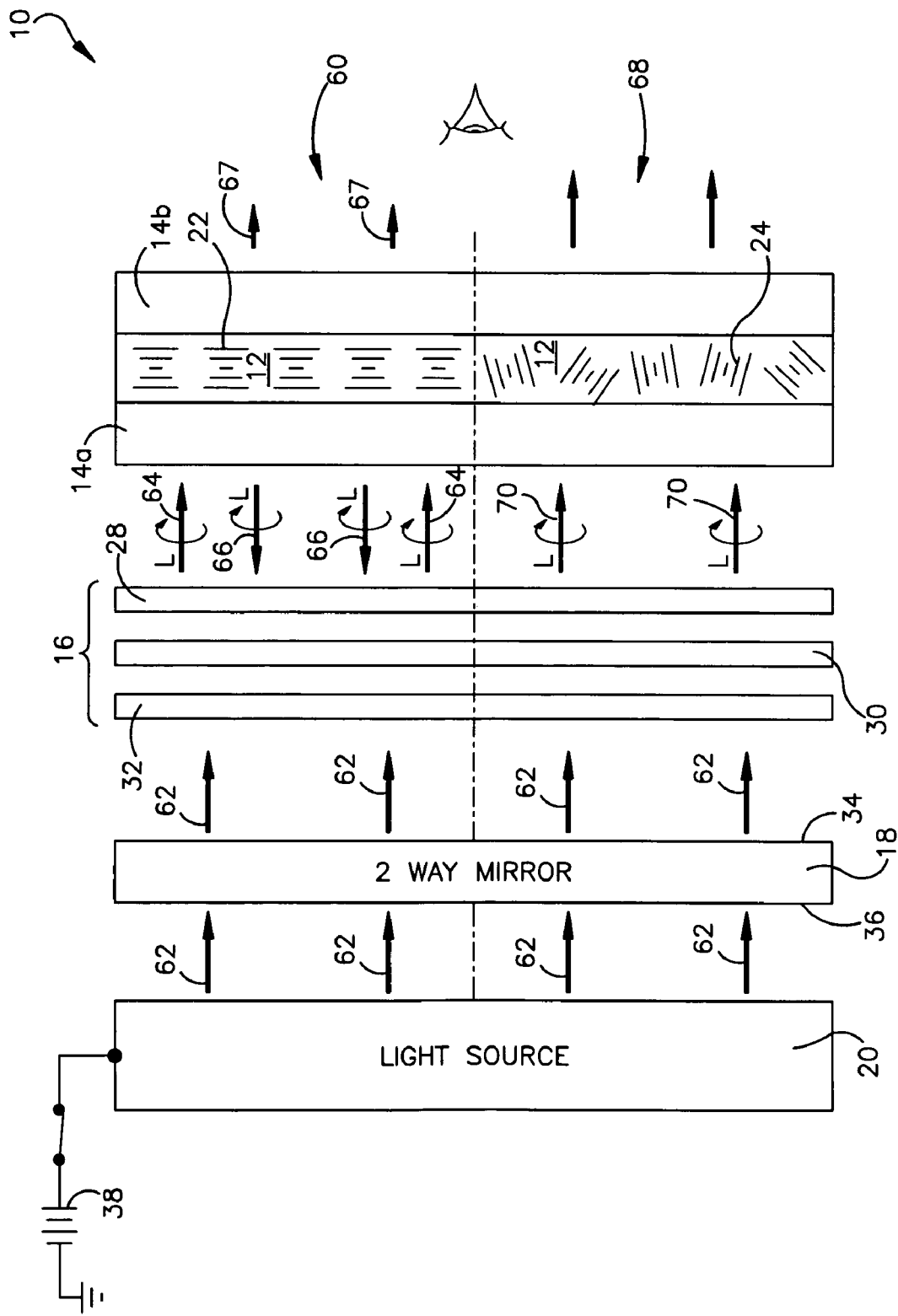
FIG. 2 is a schematic representation of the liquid crystal display of the present invention operating in a transmissive mode.

FIG. 2 illustrates the liquid crystal display being operated in a transmissive or back-lit mode. The upper half 60 of FIG. 2 illustrates the dark state of the liquid crystal display 10 operating in a transmissive mode. Unpolarized, collimated light 62 is emitted by the light source 20 and is transmitted through the transflector 18. The light 62 passes through the ambidextrous circular polarizer 16 and becomes left circularly polarized. The liquid crystal material 12 is controlled to exhibit the planar texture 22. The left circularly polarized light 64 is reflected by the liquid crystal. Since there are no right-handed components, light transmission through the planar texture 22 is minimal. In the illustrated embodiment, the reflected light 66 is left circularly polarized and changes to linear polarization due to the quarter wave retarder. The state of polarization of the light 66 is perpendicular to the transmission axis of the polarizer and, therefore, gets absorbed by the polarizer. There is some light leakage 67 from the display, due to the fact that the planar texture only has a peak reflectance of approximately 50%. To minimize light leakage 67 from the display, the spectrum of the back light is tuned to closely match the reflection spectrum of the display to improve contrast. In the exemplary embodiment, the display reflects approximately 50% of incident light (i.e. 100% of the light of a particular handedness of the narrow bandwidth emitted by the light source).

The bottom half 68 of FIG. 2 illustrates the bright state of the liquid crystal display 10 being operated in the transmissive mode. The light source 20 emits light 62 through the transflector 18. The light 62 is left circularly polarized by the ambidextrous circular polarizer 16. The chiral nematic liquid crystal material 12 is controlled to exhibit the focal conic texture 24. The left circularly polarized light 70 passes through the liquid crystal material 12. The net result is a bright state in which is transmitted through the focal conic texture.

In one embodiment, the disclosed backlighting scheme is used for a stacked display. In one embodiment, the stacked display is a monochrome double stacked display. The scheme for the monochrome double stacked display works essentially the same way as the disclosed single layer display. Both cells have a near perfect planar texture (S3>0.75). The near perfect planar texture can be achieved by rubbing both surfaces of both cholesteric display layers. In the exemplary embodiment, the cells have opposite handedness cholesteric materials. As a result, the handedness of the ambidextrous circular polarizer is arbitrary. In one embodiment, the top layer is partially rubbed or unrubbed. In one embodiment, the stacked display is a full color, triple stack display.

An example of a stacked display that may be modified in accordance with this embodiment is disclosed in U.S. patent applications Ser. No. 09/378,830, filed on Aug. 23, 1999 entitled "Brightness Enhancement for Bistable Cholesteric Displays" and Ser. No. 09/329,587, filed on Jun. 10, 1999 entitled "Stacked Color Display Liquid Crystal Display Device," which are incorporated herein by reference in their entirety.

In one embodiment, a scattering layer or light control film is added on top of a cell of a display to improve viewing of the display. Acceptable scattering layers or light control films may be obtained from Optical Coating Laboratory, Inc. (OCLI is a JDI Uniphase company) or Nitto Denko.

The present invention provides a simple way to view reflective cholesteric displays under low ambient lights. The backlit or transmissive mode is used only when ambient light is insufficient to view the display, thereby reducing the power consumption. The display image is reversed between the front lit mode and the back lit mode. If reversal of the image is not desirable, the display can be addressed in the inverse when the back light is turned on. The liquid crystal display of the present invention achieves contrast in low ambient lighting conditions. In addition, it does not affect the contrast and viewing characteristics of the display under normal or bright ambient lighting conditions.

Rubbing Parameters

A rubbing process and rubbing parameters suitable for use in the present invention will now be described. These rubbing parameters were employed to produce FIGS. 6–8 that show the S3 (stokes parameter) measurements, and FIGS. 3–5 that show reflectance curves relating to choice of alignment layer materials. Rubbing of polyimide films is a standard process in the manufacture of twisted nematics (TN's) and super twisted nematic (STN) liquid crystal displays. The rubbing process is performed after the polyimide is coated on the substrate and cured and prior to panel-to-panel assembly. The process involves buffing or rubbing the surface of the polyimide film with a velvet cloth. The rubbed film provides a preferred alignment direction for the liquid crystal molecules. The rubbing process parameters or conditions as well as the chemical characteristics of the polyimide film impact the electro-optical performance of the display.

A Rubbing and Dry Cleaning Module manufactured by Hornell Engineering, Inc., Model No. RM-400-RR-DC may be used. This is a high performance computer-controlled polyimide rubbing tool used in the manufacture of liquid crystal displays.

In operating the machine, the operator enters values for the process parameters via the computer. One set of process parameters that can be employed is as follows:

TABLE 1 table angle: 0°
table speed: 100 mm/sec
roller angle: 0°
roller speed: 500 rpm counterclockwise rotation
plate thickness: 0.55 mm
table load angle: 0°
roller rub pressure: 0.35 mm
rub direction: forward
roller motor: on with rubbing
number of passes: 1.

Operating the rubbing equipment to produce the properties of the liquid crystal displays of the present invention is well within the abilities of those skilled in the art. Those skilled in the art will also appreciate that the above rubbing parameters may be varied.

Polarization Measurement

A measurement of S3, the normalized Stokes parameter, suitable for use in the present invention, will now be described. S3 is the difference between flux density transmitted by a right-circular polarizer and a left-circular polarizer. Due to the scattering (diffuse reflectance) nature of reflective cholesteric displays, an integrating sphere was used to carry out the S3 measurement. This ensures that the display is uniformly illuminated.

The normalizations for the right and left circular polarizers are separate in order to compensate for transmission differences between the two polarizers. It should also be noted that the reflection from a perfectly aligned planar cholesteric sample (thickness greater than 3 μm) is completely circularly polarized near the surface normal within the reflection band. However, the S3 value in the reflection band will not be +1 for a right handed material. The reason is the 4% surface reflection from the front glass. This 4% reflection is not circularly polarized. Therefore, the perfect cholesteric texture only reflects 50% of the available intensity, which is 96%. Of this reflected light, 4% is also reflected back into the display. Therefore, only about 46% of the light that reaches the detector is right circularly polarized. This will give an S3 value of about +0.90 instead of +1 for a perfectly aligned cholesteric sample. Therefore, it is to be noted that the maximum degree that reflected light can be circularly polarized results in an S3 value of about +0.90 for a right handed material and −0.90 for a left handed material.

Rubbing of the substrates 14a, 14b will now be described by reference to the following non-limiting examples.

RUBBING EXAMPLE 1

A display was prepared having a homogeneous alignment surface in the form of a rubbed polyimide on only one substrate. The other substrate included an unrubbed layer of polyimide (inhomogeneous alignment surface) and served to stabilize the focal conic texture. The display comprised four separate test cells, each of the test cells including opposing glass substrates separated by 5 μm glass cell spacers (this cell spacing being used in all cells discussed in this disclosure). The arrays were assembled and vacuum filled with the following cholesteric liquid crystal mixture: 75.60% BL061 from Merck Darmstadt, 23.90% E44 from Merck and 00.50% C6 (4-hexylamino-4'-nitro-azobenzene). Disposed on both glass substrates from the manufacturer (Applied Films Corp., T1X0100 in all examples herein) was a hardcoat and ITO electrodes. Applied to this was a Nissan 720 hard coat material for preventing shorting in the well known manner (800 Angstroms "Å" on both sides). On top of this was Nissan 7511 polyimide alignment layer (250 Å on both sides). Each of the test cells included 4 pixels each having a size of 22 mm by 22 mm. The average domain size for the stabilized cholesterics ranged from 3 μm to about 10 μm.

The rubbing parameters for each pixel on one of the substrates is described in the following Table 2.

TABLE 2

| Pixel No. | No. of Rubs | Rubbing Mass (g) |
|---|---|---|
| 0 | 0 | — |
| 1 | 1 | 250 g |
| 2 | 3 | 250 g |
| 3 | 6 | 250 g |
| 4 | 12 | 250 g |
| 5 | 5 | >1000 g |
| 10 | 10 | >1000 g |

Figure 9:
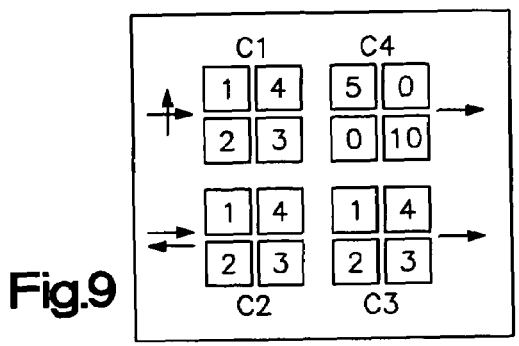
FIG. 9 is a schematic view of cells in which one substrate was unrubbed and the other substrate was rubbed with various rubbing pressure and numbers of rubs, the rubbing directions of the rubbed substrate being shown by the arrows.

Each pixel was rubbed differently. All four cells were rubbed on one side only. The arrows in FIG. 9 show the direction of rubs for each pixel of each test cell rubbed according to the parameters shown in Table 2. The pixels were rubbed using a thin plastic mask, which ensured that each pixel is controlled independently. Although the test cell used a mask, to make more homogeneously aligned pixels commercially, the entire substrate may be rubbed such as by using the Hornell rubbing machine. There are four test cells per substrate. The stronger rubs form larger planar domains due to a stronger alignment in the parallel direction. The weaker rubs leave the alignment layer with little azimuthal preference and thus the defect numbers are greater and the size of the planar domains is smaller. In the case of multiple directions of rubbing, the indicated number of rubs were made in alternating directions on the same substrate, represented by arrows in FIG. 9. The two pixels (0) in cell 4 (C4) were unrubbed and serve as the control pixels.

When orienting the array such that the display with the unrubbed polyimide faced the viewer, cells C1, C2 and C3 showed slight changes in textures. In these cells, the planar domains were somewhat larger along the rub direction. The rubbing in orthogonal directions in the cell C1 seemed to cancel each other out. However, this was not the case in the cell C2 where consecutive rubbings were anti-parallel. In the cell C2 the antiparallel rubs seemed to enhance each other. There was very little electrooptical difference between each pixel of these three cells C1, C2 and C3. The peak brightness of the control pixels in cell C4-pixel 0, was about 31%. The peak brightness increased in pixel 4 of cells C1 and C2 to about 33.5%. The brightness gain in pixel 4 of cell C3 was not measurable. The contrast did not change substantially in cells C1, C2 and C3. These rubbed pixels showed a slightly different appearance in the specular direction. Rubbing artifacts were visible with the naked eye.

In contrast, Cell C4, which was produced in accordance with the present invention, showed dramatically different results compared to the other cells. The rubbing mass was much higher on pixels 5 and 10 of cell C4 (5 and 10 rubs at a rubbing mass of greater than 1000 g, respectively). Pixel 0 was used as a control pixel. Due to the fact that the rubbing strength was significantly higher in cell C4, the domain sizes were much bigger.

Figure 12:
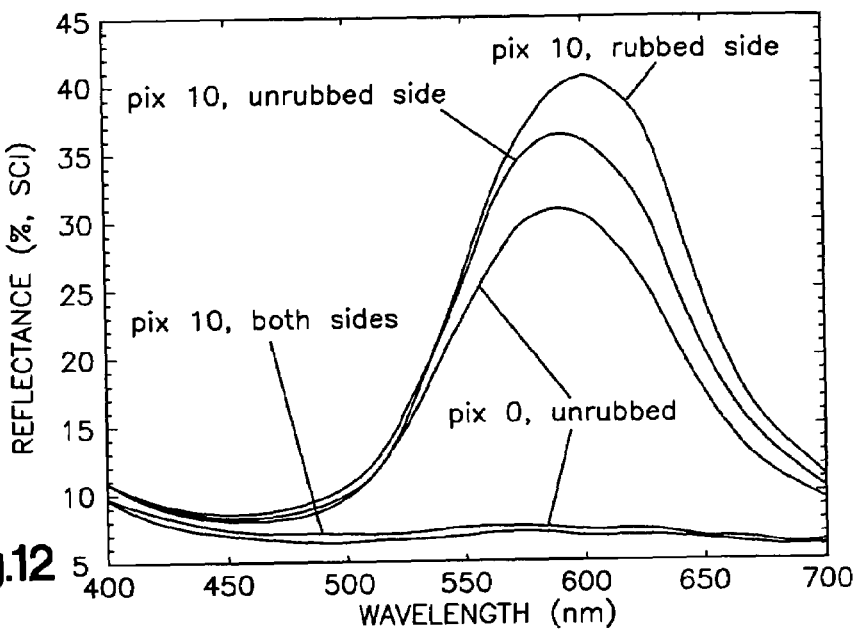
FIG. 12 shows reflection spectra of C4 pixels 10 and 0 from FIG. 9 as viewed from both sides, planar and focal conic.
Figure 10:
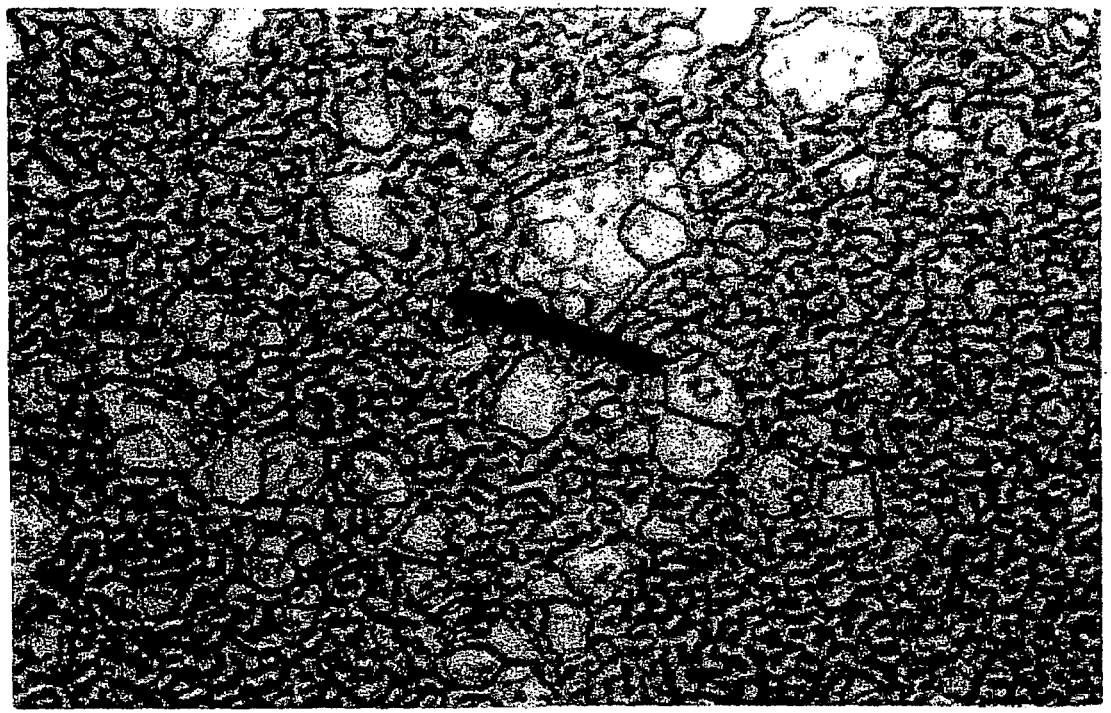
FIG. 10 is a microscope photograph of a cholesteric liquid crystal display cell that is rubbed on one side and unrubbed on the other, as seen from the rubbed side.
Figure 11:
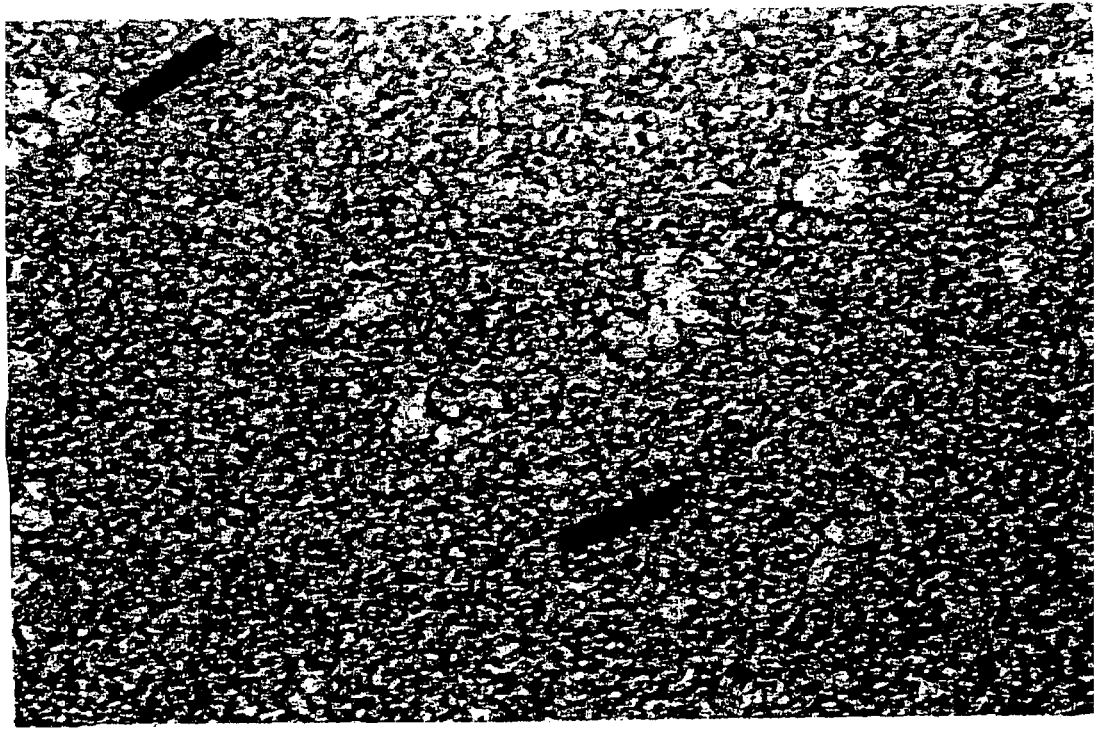
FIG. 11 is a microscope photograph of a cholesteric liquid crystal display cell that is rubbed on one side and unrubbed on the other, as seen from the unrubbed side.

Photographs of the textures from cell C4 are shown in FIGS. 10 and 11. As a result of the larger domains, the brightness gain was dramatically higher. For pixel 10, the peak brightness as measured with the rubbed side up went up from about 31% to about 41%. This was an increase in peak brightness of about 32% over the unrubbed control pixel. Due to the larger planar domains, the texture when viewed from the rubbed side, appeared shiny or metallic. This is because the larger domains contribute to the specular direction only. Specular reflection, which occurs in the case of the texture with large domains, is to be contrasted with diffuse reflection, which occurs in a typical cholesteric liquid crystal display. The contrast lowers due to the appearance of small planar domains in the focal-conic texture or off state. The reflectance from the planar and focal-conic textures for cell C4 is shown in FIG. 12. Pixel 0 reflectance is also shown for comparison. One focal-conic reflectance spectra for pixel 10 is shown in FIG. 12. None of the cells were rubbed on both sides.

It is important to note that contrast is maintained due to the fact that only one substrate is rubbed and the rubbed surface has a high pretilt angle. The unrubbed substrate introduces defects in the texture, giving the planar and focal-conic states their zero field stability.

When the cell C4 is viewed so that the unrubbed alignment layer material is closer to the viewer, the display looks very different as shown in FIG. 11. As discussed above, from this view the larger planar domains appear to be covered by smaller domains. This indicates that the nature of the domain structure was varying significantly along the depth of the display. The helical axis orientation distribution in larger domains was strongly peaked about the surface normal. The helical axis of planar domains in the perfect planar texture is perpendicular to the substrate, which results in high brightness. In cells not in the perfect planar state, a smaller amount of planar domains have their helical axis oriented along the surface normal, resulting in less bright or black regions. The helical axis distribution was wider in the smaller domains as previously shown in Taheri, B. et al., *Proc. of SID* 96, 39 (1996); and Khan et al., *Proc. of SID* 96, 607 (1996), which are incorporated herein by reference in their entireties.

The peak brightness for pixel 10 in the cell C4 from the unrubbed side increased to a value of about 37%. The display did not have a shiny appearance when viewed from this side, and the viewing angle was preserved. The contrast was lowered as much as when viewing from the rubbed side.

The cells C1, C2, and C3 did not show appreciable differences from when they were viewed from the unrubbed side. The brightness gain was lower. However, the rubbing artifacts that were visible with the naked eyes from the rubbing side were either not present, or were very faint, from the unrubbed side.

It has also been shown that rubbing with a relatively hard pressure results in near ideal domain distribution that enhances brightness. Rubbing parameters and alignment layers may also be used to control the domain distribution. It has also been shown that rubbing the entire substrate without a mask automatically provides a spatially distributed alignment control that can be effectively used to optimize the optics and electro-optics of cholesteric displays. This eliminates the need for a mask. Furthermore, the manufacturing is simple since conventional rubbing techniques are employed. No new equipment is required.

RUBBING EXAMPLE 2

Figure 13:
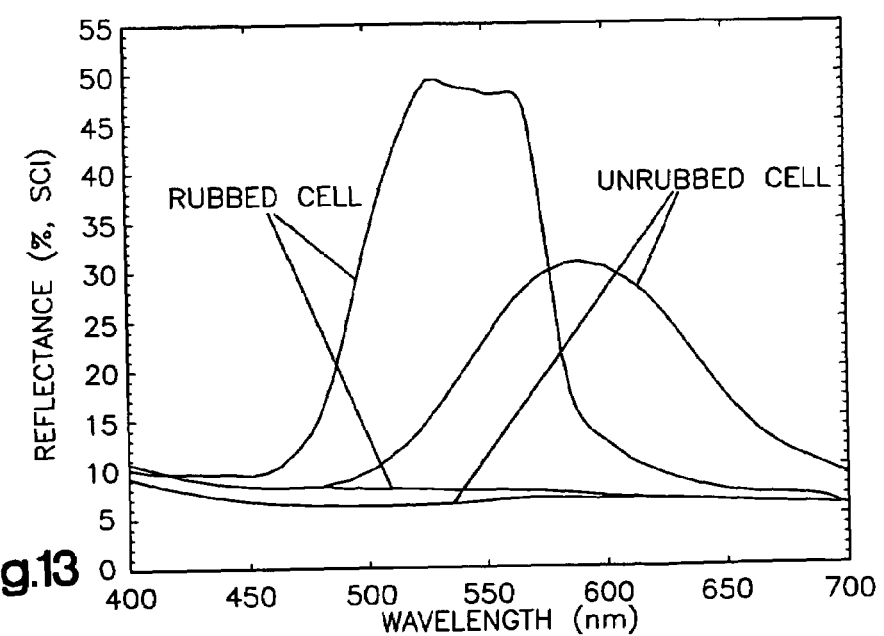
FIG. 13 shows reflection spectra from a cell with rubbed 7511 alignment material on both substrates, the reflection from unrubbed 7511 being shown for reference.

Another embodiment of the present invention employs homogeneous alignment surfaces in the form of rubbed polyimide layers each disposed adjacent one of the substrates. The display comprised opposing glass substrates separated by a 5 µm cell spacing. The display was assembled and vacuum filled with the following Merck cholesteric liquid crystal mixture: 77.60% BL061 from Merck, 12.10% E44 from Merck, 10.0% p-cyanopentylbenzene as described in U.S. Pat. No. 6,172,720, entitled "Low Viscosity Liquid Crystal Material" to Khan et al., which is incorporated herein by reference, and 00.30% C6, the reflectance curves of which are shown in FIG. 13. The unrubbed cell shown in FIG. 13 included 75.6% BL061, 23.9% E44 and 0.50% C6. Disposed on both substrates was Nissan 720 hard coat material (800A on both sides), and on top of this was Nissan 7511 polyimide alignment layer (250 Å). The same substrates with hardcoat and ITO coatings described in Example 1 were used here. Another display was prepared identically except that it included the alignment layer of a thickness of 150 Å. The displays of both thicknesses of alignment layer showed similar results. Only two rubs were made on each substrate. The rubbing strength was light (about 1 kilogram or less) on both substrates, and the rubs were parallel.

The planar texture in the cell had a shiny or "metallic" appearance in view of the fact that the planar domains were very large, with few defects. The focal-conic texture was also stable under zero field conditions. FIG. 13 shows the reflection spectra for the two textures in the cell having both sides rubbed. The reflection from unrubbed surfaces are also shown for comparison. The generally square shape of the reflection band in the planar texture of the rubbed cell is indicative of the perfect planar texture.

In the case of using Nissan 7511 brand polyimide alignment material, lightly rubbed on both sides, the focal-conic texture was stable without the use of a polymer network in the liquid crystal material. This makes a unique device in the sense that the planar texture is substantially without defects (perfect) and the focal-conic texture was stable. Therefore, a bistable (zero field) cell can be made with a perfect planar texture, and a good focal-conic texture (low back scattering).

There are numerous advantages to the perfect planar texture, including high reflectivity, a peak brightness that approaches 50%, a unique appearance, and a known polarization state of the reflected or transmitted light. The preservation of the polarization state of the reflected and transmitted light enables the use of back lighting. However, there is a sacrifice in the view angle compared to conventional surface stabilized rubbed cholesteric liquid crystal displays, and the metallic appearance of the planar texture may be undesirable in some cases.

EXAMPLE 3

Alignment Layer Materials

Figure 3:
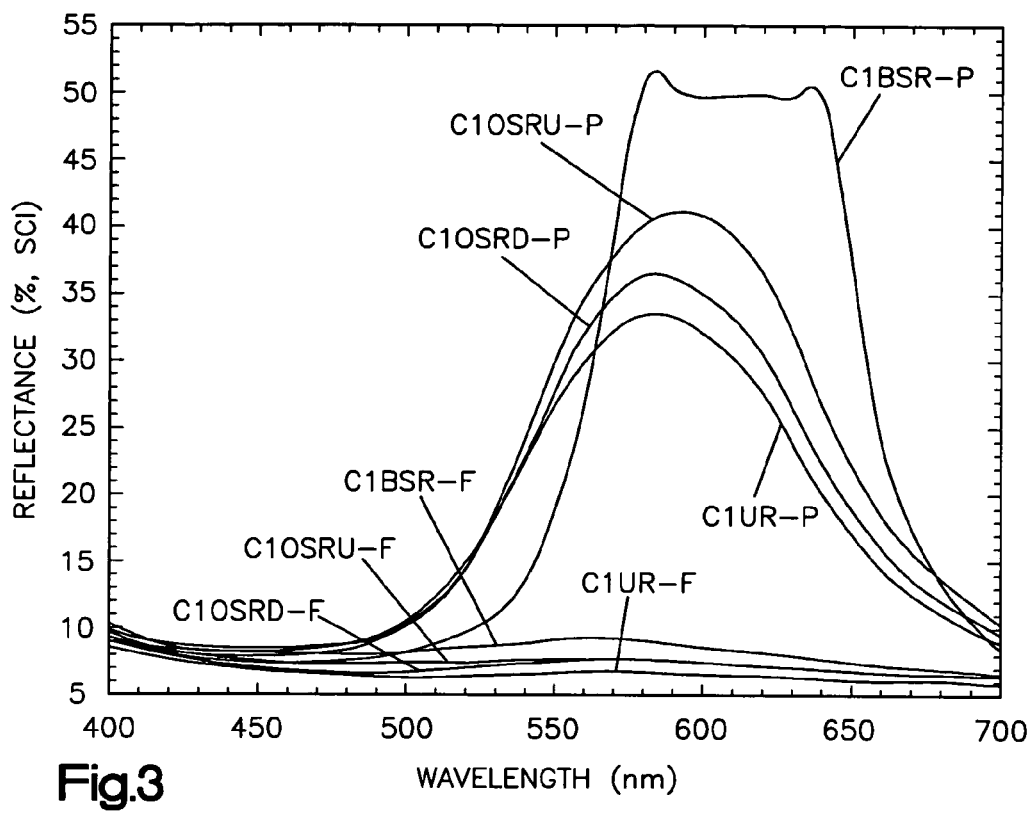
FIGS. 3–5 are reflection spectra for cells using Nissan 7511, Nissan 5211 and Dupont 2555 alignment layer materials, respectively, for cells with both sides rubbed, one side rubbed as viewed from both the rubbed and unrubbed sides, and for an unrubbed cell.
Figure 4:
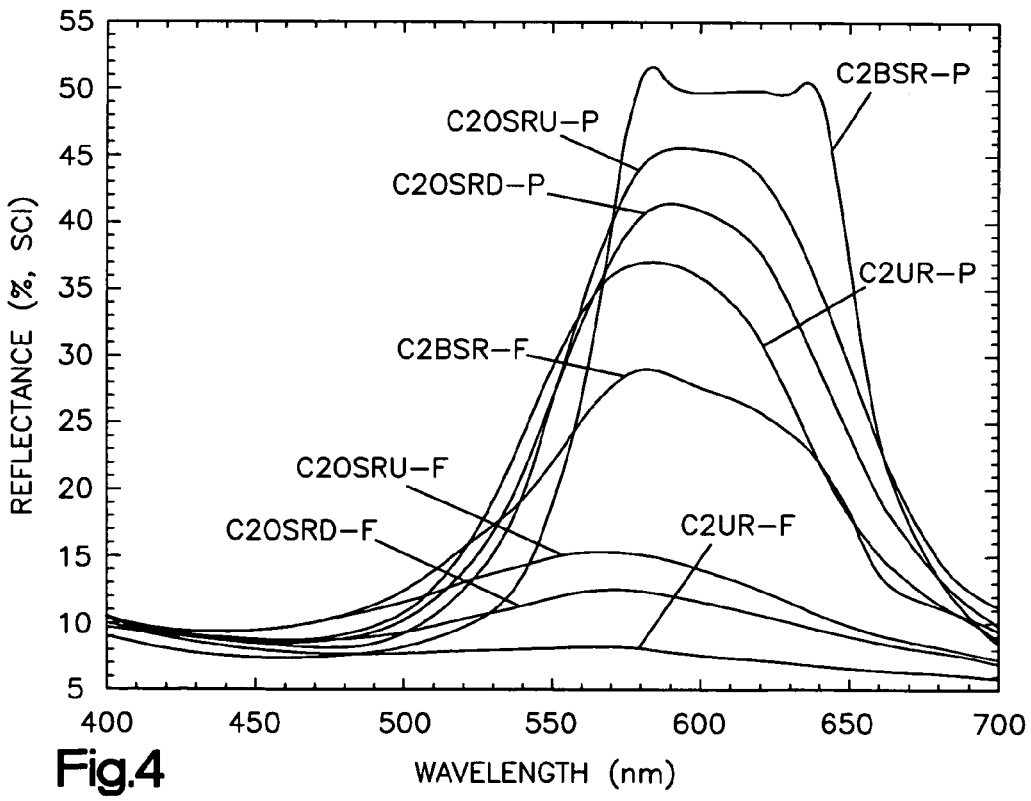
Figure 5:
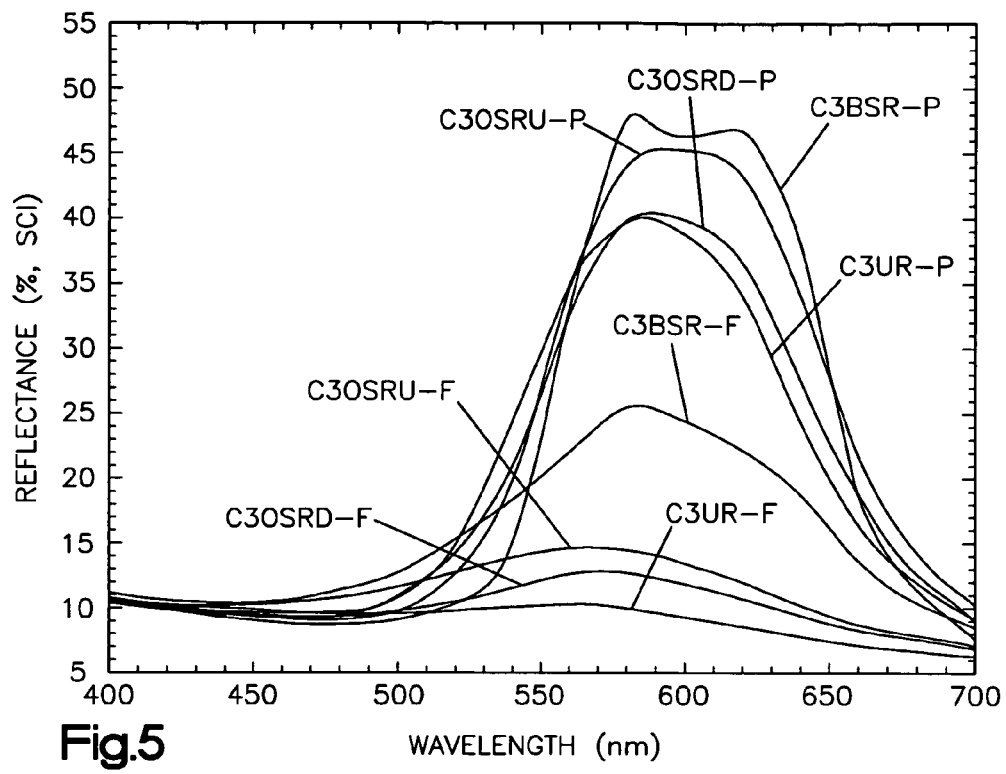

Three types of cells were prepared each with a different alignment layer material, Cells 1, Cells 2 and Cells 3. All of Cells 1 were prepared with Nissan 7511 polyimide alignment material, all of Cells 2 were prepared with Nissan 5211 polyimide alignment material and all of Cells 3 were prepared with DuPont 2555 polyimide alignment material. Three cells were prepared using each type of alignment layer material for a total of nine cells. In FIGS. 3–8, for each type of alignment layer material there was prepared one cell having both sides unrubbed (e.g., "C1$_{UR-P}$"), one cell having one side rubbed and one side unrubbed (e.g., "C1$_{OSRU-P}$") and one cell having both sides rubbed (e.g., "C1$_{BSR-P}$"). Portions of these designations are underlined in the text for emphasis and are not underlined in the drawings. In the figures, cells rubbed on only one side were provided with further designations regarding whether the rubbed side was up ("U") or down ("D") (e.g., C1$_{OSRU-P}$). That is, if the cell was rubbed on one side with the rubbed side up or nearer to the viewer, the unrubbed side was down or away from the viewer and visa versa. In the case of all cells the figures designate whether the spectra was of the planar ("-P") or focal-conic ("-F") texture (e.g., C1$_{OSRU-F}$). The effects of alignment layer material on reflectance of Cells C1, C2, and C3 are shown in FIGS. 3–5, respectively. All of these cells were produced with the rubbing conditions described in the section entitled "Rubbing Parameters." All of the cells in FIGS. 3–8 employed the following composition (% by weight): 75.6% BL061, 23.9% E44, 0.5% C6.

The reflectance for the cells having both sides rubbed was the highest for all of the alignment layer materials with regard to the other rubbing conditions, and was about 50% SCI (specular component included) for the Nissan 7511 and Nissan 5211 alignment layer materials of Cells C1 and C2. The focal-conic reflectance of the Nissan 7511 C1 cells was much lower than for the Nissan 5211 C2 cells and the DuPont 2555 C3 cells. In the case of the C2 and C3 cells, the focal-conic reflectance of the cells having both sides rubbed exceeded 20%, whereas the focal-conic reflectance of the C1 cell under all rubbing conditions was less than 10%. Thus, the contrast of the C1$_{BSR}$ cell was much better than the contrast of the C2$_{BSR}$ and C3$_{BSR}$ cells. This illustrates the dramatic effect of the choice of alignment layer material on cell contrast.

In the case of cells having both sides rubbed that are produced in accordance with the present invention, it is especially preferred to select a high pretilt alignment layer material such as Nissan 7511 alignment layer material. A high pretilt alignment layer material that provides the liquid crystal director with a pretilt angle of at least 10° is preferably used for cells in which both sides are rubbed. This provides high contrast for these cells.

Display configurations may use the Dupont 2555 polyimide, such as by placing Nissan 7511 on one substrate and DuPont 2555 on the other substrate of a cell. This way, the DuPont 2555 alignment layer can serve to improve the brightness of the planar texture, while the Nissan 7511 layer may provide improved contrast. As before, depending on which side the display is viewed, either the contrast or the brightness of the display, may be enhanced.

It is believed to be well within the ability of those skilled in the art to determine various alignment materials that are suitable for use in the present invention. It is shown herein that selection of alignment layer material based upon degree of pretilt influences the various properties of the inventive cells.

EXAMPLE 4

Figure 6:
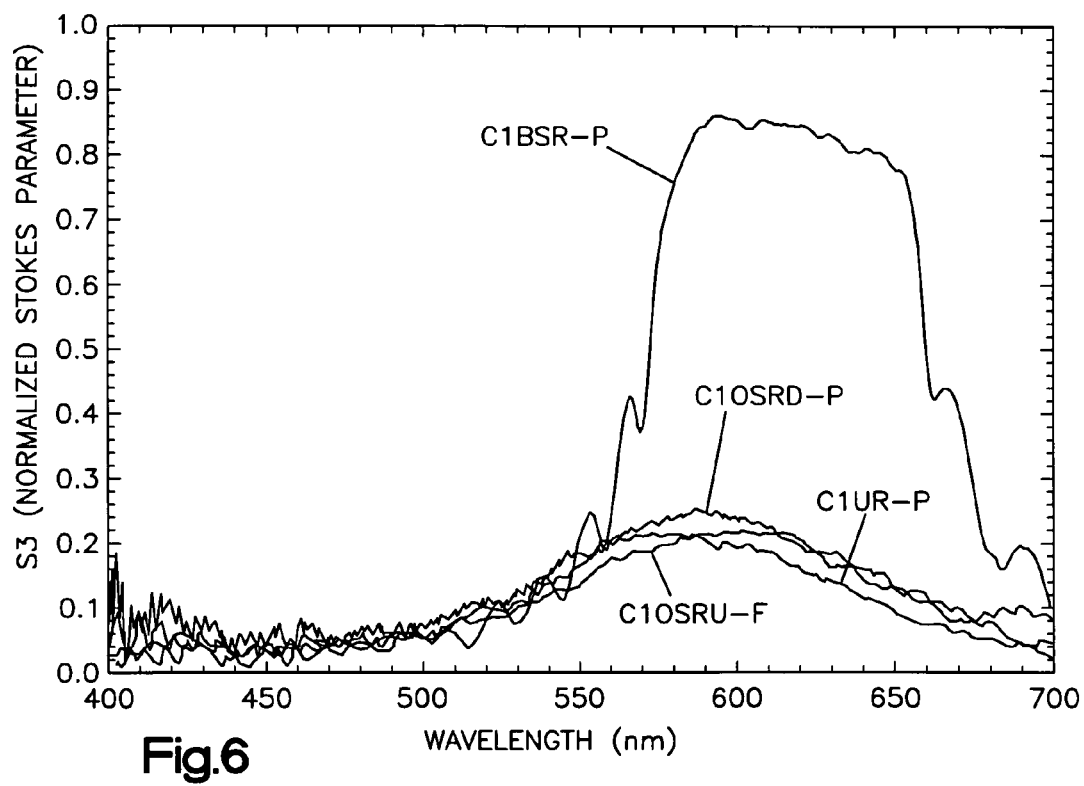
FIGS. 6–8 are graphs of S3 (normalized Stokes parameter) as a function of wavelength for cells using Nissan 7511, Nissan 5211 and Dupont 2555 alignment layer materials, respectively, for cells with both sides rubbed, one side rubbed as viewed from both the rubbed and unrubbed sides, and for an unrubbed cell.
Figure 7:
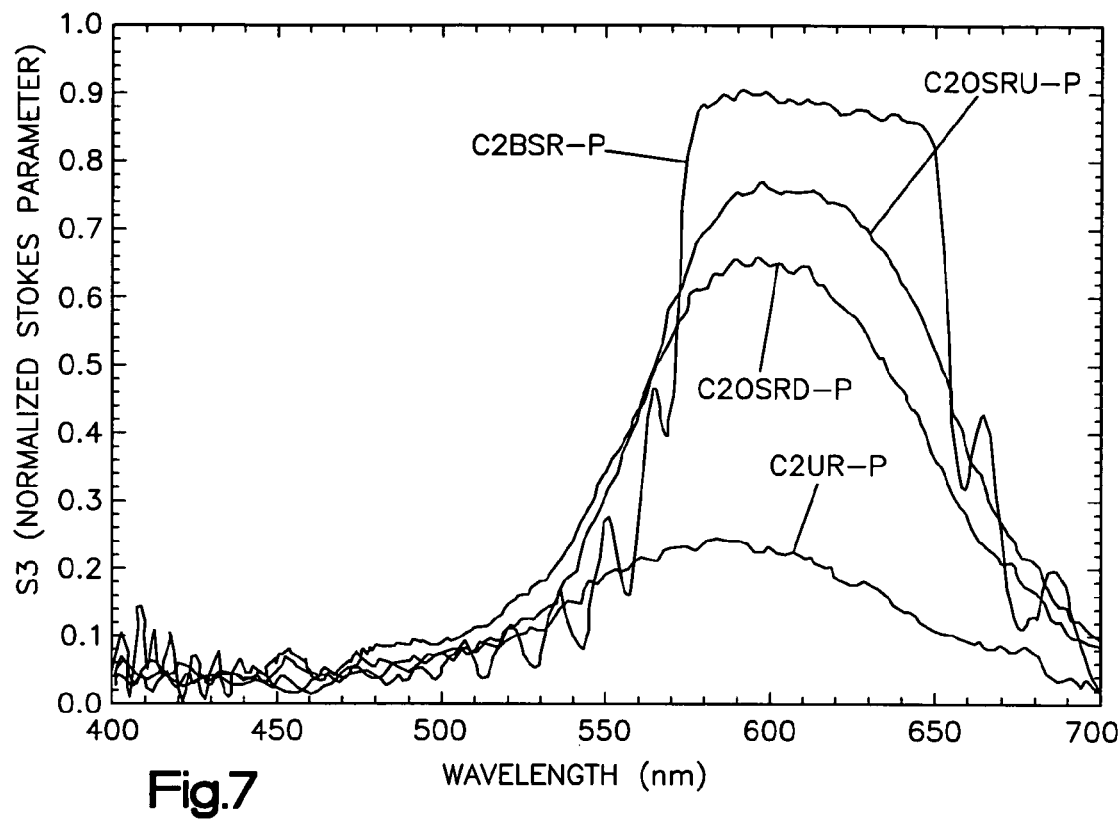
Figure 8:
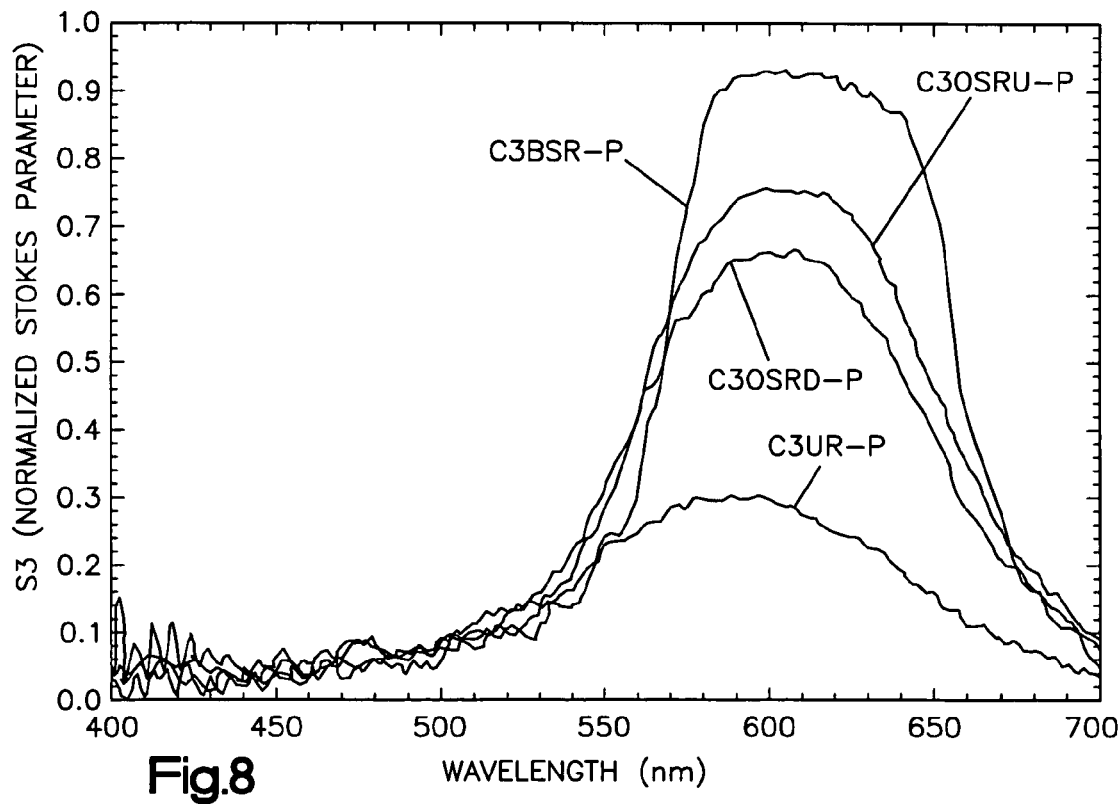

S3 Measurement:

The cells identified in Example 3 were tested for the degree of circular polarization of the reflected light as defined by S3, the normalized Stokes parameter. FIG. 6 shows the results for the C1 cells employing the Nissan 7511 alignment layer material. FIG. 7 shows the results for the cells C2 employing the Nissan 5211 alignment layer material. FIG. 8 shows the results for the C3 cells employing the DuPont 2555 alignment layer material. As shown in FIG. 6, the reflection from the stable planar texture of the cell rubbed on both sides C1$_{BSR}$ had a high degree of circularly polarization with an S3 value of at least about 0.8. The C1$_{OSR}$ cell did not have a much higher degree of circularly polarized light than the unrubbed cell C1$_{UR}$.

As can be seen in FIG. 7, for the C2 cells using the Nissan 5211 alignment layer material, the reflected light from cell C2$_{BSR}$ had a high degree circular polarization with an S3 value exceeding 0.75. The degree of circular polarization of reflected light from the cell C2$_{OSR}$ was much higher than in the C1$_{OSR}$ cell from both sides of the cell. The degree of circular polarization from the rubbed side (C2$_{OSRU-P}$) exceeded that from the unrubbed side (C2$_{OSRD-P}$).

As can be seen in FIG. 8, in the case of the C3 cells employing DuPont 2555 alignment layer material, the degree of circular polarization from the C3$_{BSR-P}$ cell was very high, with an S3 value greater than 0.92. This S3 value approaches the maximum possible value of degree of circular polarization for a cholesteric cell. FIG. 8 shows that the degree of circular polarization of the reflected light from the sides of the cell C3$_{OSRU-P}$ and C3$_{OSRD-P}$ was good, with the degree of circular polarization from the rubbed side (C3$_{OSRU-P}$) exceeding that from the unrubbed side (C3$_{OSRD-P}$).

The above results indicate that the selection of alignment layer material and rubbing conditions may strongly influence the electrooptical performance of the cell. The Nissan 7511 polyimide alignment material has a high pretilt angle of about 21° from the substrate. A high pretilt angle alignment layer material is believed to be especially suited for use in a cell in which both sides are rubbed. The high pretilt polyimide C1$_{BSR}$ cell had very high reflectance in the planar state and very low reflectance in the focal-conic state, resulting in very good contrast. In addition, the reflected light had a high degree of circular polarization. The cell having both sides rubbed has a relatively narrow viewing angle, however. The low pretilt alignment materials used in cells C2 (1 degree pretilt) and C3 (3 degree pretilt) rubbed on both sides, had very high focal conic reflectance, and were less suitable than the Nissan 7511 for making cells rubbed on both sides.

All three of the alignment layer materials may be suitable for forming cells having one rubbed side and one side with an inhomogeneous alignment surface. The Nissan 7511 polyimide cell (C1$_{OSR\ U-F}$, C1$_{OSRD-F}$) had the lowest focal-conic reflectance, less than about 8% reflectance. The DuPont 2555 polyimide cell (C3$_{OSRU-F}$, C3$_{OSRD-F}$) and the Nissan 5211 cell (C2$_{OSRU-F}$, C2$_{OSRD-F}$) has less than 16% focal-conic reflectance. It is apparent that while the Nissan 7511 C1$_{OSR}$ cell had the best contrast, it had the lowest degree of circular polarization. The C2$_{OSR}$ and C3$_{OSR}$ cells, on the other hand, had lesser contrast than the $Cl_{OSR}$ cell, but good brightness and a high degree of circular polarization. Based upon the foregoing, it will be apparent that one skilled in the art utilizing this disclosure may tailor a cell to a particular application based upon features including rubbing conditions and selection of the alignment layer materials.

One may use any combination of the Nissan 7511, the Nissan 5211 or the DuPont 2555 polyimides alignment layer materials on various sides of a cell or various cells of a stacked display. Selection of the alignment layer material for the cell that is rubbed on only one side, is dependent upon empirically determining a balance of features including contrast, brightness, and degree of circular polarization, variations of which would be apparent to one skilled in the art in view of this disclosure.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

We claim:

1. A bistable, backlit cholesteric liquid crystal display, comprising:
   a) a layer of cholesteric liquid crystal material located between first and second substrates, said cholesteric liquid crystal material including focal conic and reflective planar textures that are stable in an absence of an electric field, said second substrate being closer to an exterior of the display than said first substrate;
   b) drive electronics adapted to electrically address regions of the cholesteric liquid crystal material effective to cause said cholesteric liquid crystal material to exhibit the focal conic and planar textures resulting in an image;
   c) a bi-directional circular polarizer having opposing sides, wherein said bi-directional circular polarizer circularly polarizes light incident from either of said opposing sides including passing circularly polarized light to said layer of cholesteric liquid crystal material;
   d) a transflector having a light reflective side and a light transmitting side, the light reflective side being adapted to reflect light received from said bi-directional circular polarizer, said bi-directional circular polarizer being located between said transflector and said first substrate; and
   e) a light source adapted to be selectively energizable to emit light, said light passing through said transflector from said light transmitting side toward said light reflecting side.

2. The liquid crystal display of claim 1 wherein said planar texture has a circular polarization of a predetermined handedness.

3. The liquid crystal display of claim 1 wherein said bi-directional circular polarizer comprises a first quarter wave retarder and a second quarter wave retarder and a linear polarizer located between said first quarter wave retarder and said second quarter wave retarder.

4. The liquid crystal display of claim 1 further comprising an alignment material on at least one of said first and second substrates.

5. The liquid crystal display of claim 4 wherein said alignment material provides a liquid crystal director of said cholesteric liquid crystal material with a pretilt angle of about 21° from the substrate.

6. The liquid crystal display of claim 4 wherein said alignment material is adapted to orient molecules of said cholesteric liquid crystal material effective to enable light reflected from said display to have an S3 stokes parameter greater than 0.75.

7. The liquid crystal display of claim 4 wherein said alignment material is adapted to orient molecules of said cholesteric liquid crystal material effective to enable light reflected from said display to have an S3 stokes parameter greater than 0.90.

8. The liquid crystal display of claim 1 further comprising a rubbed alignment material on both of said first and second substrates.

9. The liquid crystal display of claim 1 further comprising a rubbed alignment material on said first substrate.

10. The liquid crystal display of claim 1 wherein said light source has a spectral distribution that matches a reflection spectrum of the display.

11. A bistable, backlit cholesteric liquid crystal display, comprising:
    a) a cholesteric liquid crystal material located between first and second substrates, said cholesteric liquid crystal material including a planar texture having a circular polarization of a predetermined handedness and a focal conic texture that are stable in an absence of an electric field, said second substrate being closer to an exterior of the display than said first substrate;
    b) drive electronics adapted to electrically address regions of the cholesteric liquid crystal material effective to cause said cholesteric liquid crystal material to exhibit the focal conic and planar textures resulting in an image;
    c) a first quarter wave retarder;
    d) a second quarter wave retarder;
    e) a linear polarizer located between said first quarter waver retarder and said second quarter wave retarder;
    f) a transflector having a light reflective side and a light transmitting side, the light reflective side being adapted to reflect light received from said second quarter wave retarder, wherein said first quarter wave retarder, said linear polarizer and said second quarter wave retarder are located between said transflector and said first substrate; and
    g) a light source adapted to be selectively energizable to emit light, said light passing through said transflector from said light transmitting side toward said light reflecting side.

12. The liquid crystal display of claim 11 wherein said light source is adapted to have a spectral distribution that matches a reflection spectrum of the display.

13. The liquid crystal display of claim 11 further comprising an alignment material on at least one of said first and second substrates.

14. The liquid crystal display of claim 13 wherein said alignment material provides a liquid crystal director of said cholesteric liquid crystal material with a pretilt angle of about 21° from the substrate.

15. The liquid crystal display of claim 13 wherein said alignment material is adapted to orient molecules of said cholesteric liquid crystal material effective to enable light reflected from said display to have an S3 stokes parameter greater than 0.75.

16. The liquid crystal display of claim 13 wherein said alignment material is adapted to orient molecules of said cholesteric liquid crystal material effective to enable light reflected from said display to have an S3 stokes parameter greater than 0.90.

17. The liquid crystal display of claim 11 further comprising a rubbed alignment material on both of said first and second substrates.

18. A bistable, backlit cholesteric liquid crystal display, comprising:
   a) a cholesteric liquid crystal material located between first and second substrates, said cholesteric liquid crystal material including focal conic and reflective planar textures that are stable in an absence of an electric field, an alignment material on at least one of said first and second substrates, said alignment material being adapted to orient molecules of said cholesteric liquid crystal material effective to enable light reflected from said display to have an S3 stokes parameter greater than 0.75, said second substrate being closer to an exterior of the display than said first substrate;
   b) drive electronics adapted to electrically address regions of the cholesteric liquid crystal material effective to cause said cholesteric liquid crystal material to exhibit the focal conic and planar textures resulting in an image;
   c) a bi-directional circular polarizer having opposing sides, wherein said bi-directional circular polarizer is adapted to circularly polarize light incident from either of said opposing sides including passing circularly polarized light to said layer of cholesteric liquid crystal material;
   d) a transflector having a light reflective side and a light transmitting side, the light reflective side being adapted to reflect light received from said bi-directional circular polarizer, said bi-directional circular polarizer being located between said transflector and said first substrate; and
   e) a light source adapted to be selectively energizable to emit light, said light passing through said transflector from said light transmitting side toward said light reflecting side.

19. A bistable, backlit cholesteric liquid crystal display device, comprising:
   a layer of cholesteric liquid crystal material including focal conic and reflective planar textures that are stable in an absence of an electric field, said layer having a first side and a second side, the second side being closer to an exterior of the display device than said first side;
   means for selectively addressing regions of the cholesteric liquid crystal material effective to cause said cholesteric liquid crystal material to exhibit the focal conic and reflective planar textures resulting in an image;
   a bi-directional circular polarizer comprising a first quarter wave retarder, a second quarter wave retarder and a linear polarizer located between said first quarter wave retarder and said second quarter wave retarder;
   a transflector having a light reflective side and a light transmitting side, said bi-directional circular polarizer being located between said transflector and said first side of said cholesteric liquid crystal material, the light reflective side being adapted to reflect light received from said bi-directional circular polarizer; and
   a light source adapted to be selectively energizeable to emit light, said light passing through said transflector from said light transmitting side toward said light reflecting side.

20. The liquid crystal display device of claim 19 further comprising an alignment layer in contact with at least one of said sides of said cholesteric liquid crystal layer, said alignment layer being adapted to orient adjacent molecules of said cholesteric liquid crystal material in a particular direction.

21. The liquid crystal display device of claim 20 wherein said molecules of said cholesteric liquid crystal material are oriented effective to enable light reflected from said display to have an S3 stokes parameter greater than 0.75.

22. The liquid crystal display device of claim 20 wherein said molecules of said cholesteric liquid crystal material are oriented effective to enable light reflected from said display to have an S3 stokes parameter greater than 0.90.

23. The liquid crystal display device of claim 19 further comprising stacked layers of said cholesteric liquid crystal material.

24. The liquid crystal display device of claim 23 wherein one of said stacked layers of said cholesteric liquid crystal material is adapted to have a pitch length effective to reflect visible light of one color and another of said stacked layers of said cholesteric liquid crystal material is adapted to have a pitch length effective to reflect visible light of a different color.

25. The liquid crystal display device of claim 23 comprising a triple stack of said liquid crystal layers, wherein one of said layers is adapted to reflect red light, one of said layers is adapted to reflect green light and one of said layers is adapted to reflect blue light.

26. The liquid crystal display device of claim 23 wherein one of said stacked layers is adapted to have a pitch length effective to reflect visible light of one color and another of said stacked layers is adapted to have a pitch length effective to reflect infrared electromagnetic radiation.

27. The liquid crystal display device of claim 19 wherein said means for selectively addressing regions of the cholesteric liquid crystal material comprises drive electronics that electrically address regions of the cholesteric liquid crystal material effective to cause said cholesteric liquid crystal material to exhibit the focal conic and planar textures resulting in an image.

28. A bistable, backlit cholesteric liquid crystal display comprising:
   a layer of cholesteric liquid crystal material including focal conic and reflective planar textures that are stable in an absence of an electric field, said layer having a first side and a second side, the second side being closer to an exterior of the display than the first side;
   drive electronics adapted to electrically address regions of the cholesteric liquid crystal material effective to cause said cholesteric liquid crystal material to exhibit the focal conic and planar textures resulting in an image;
   polarizing means for circularly polarizing light in two opposite directions and for passing circularly polarized light to said layer of cholesteric liquid crystal material;
   a transflector having a light reflective side and a light transmitting side, said bi-directional circular polarizer being located between said transflector and said first side of said layer of cholesteric liquid crystal material, the light reflective side being adapted to reflect light received from said polarizing means; and
   a light source adapted to be selectively energizable to emit light, said light passing through said transflector from said light transmitting side toward said light reflecting side.

29. A bistable, backlit cholesteric liquid crystal display comprising:
   a layer of cholesteric liquid crystal material including focal conic and reflective planar textures that are stable in an absence of an electric field, said layer having a first side and a second side, the second side being closer to an exterior of the display than the first side, an alignment material on at least one of said first and second substrates, said alignment material being adapted to orient molecules of said cholesteric liquid crystal material effective to enable light reflected from said display to have an S3 stokes parameter greater than 0.75;

drive electronics adapted to electrically address regions of the cholesteric liquid crystal material effective to cause said cholesteric liquid crystal material to exhibit the focal conic and planar textures resulting in an image;

a bi-directional circular polarizer;

a transflector having a light reflective side and a light transmitting side, said bi-directional circular polarizer being located between said transflector and said first side of said layer of cholesteric liquid crystal material, the light reflective side being adapted to reflect light received from said bi-directional circular polarizer; and a light source selectively energizeable to emit light, said light passing through said transflector from said light transmitting side toward said light reflecting side.

30. A bistable, backlit cholesteric liquid crystal display comprising:

a layer of cholesteric liquid crystal material including focal conic and reflective planar textures that are stable in an absence of an electric field, said layer having a first side and a second side, the second side being closer to an exterior of the display than the first side, a substrate having one side in contact with said second side of said layer of cholesteric liquid crystal display material and another side forming an external surface of said display;

drive electronics adapted to electrically address regions of the cholesteric liquid crystal material effective to cause said cholesteric liquid crystal material to exhibit the focal conic and planar textures resulting in an image;

a bi-directional circular polarizer;

a transflector having a light reflective side and a light transmitting side, said bi-directional circular polarizer being located between said transflector and said cholesteric liquid crystal material, the light reflective side being adapted to reflect light received from said bi-directional circular polarizer; and a light source adapted to be selectively energizable to emit light, said light passing through said transflector from said light transmitting side toward said light reflecting side.

31. A bistable, backlit cholesteric liquid crystal display comprising:

a layer of cholesteric liquid crystal material including focal conic and reflective planar textures that are stable in an absence of an electric field, said layer having a first side and a second side, the second side being closer to an exterior of the display than the first side;

electrical addressing means for electrically addressing regions of the cholesteric liquid crystal material effective to cause said cholesteric liquid crystal material to exhibit the focal conic and planar textures resulting in an image;

polarizing means for circularly polarizing light in two opposite directions including passing circularly polarized light to said layer of cholesteric liquid crystal material;

transflector means for reflecting light incident on one side of the transflector and transmitting light incident on the other side of the transflector, said polarizing means being located between said transflector and said first side of said layer of cholesteric liquid crystal material; and means for emitting light from said light transmitting side of said transflector toward said light reflecting side of said transflector.

32. A bistable, backlit cholesteric liquid crystal display comprising:

a layer of cholesteric liquid crystal material including focal conic and reflective planar textures that are stable in an absence of an electric field, said layer having a first side and a second side, the second side being closer to an exterior of the display than the first side;

drive electronics adapted to electrically address regions of the cholesteric liquid crystal material effective to cause said cholesteric liquid crystal material to exhibit the focal conic and planar textures resulting in an image;

a bi-directional circular polarizer;

a transflector having a light reflective side proximal to said bi-directional circular polarizer and a light transmitting side distal from said bi-directional circular polarizer, said bi-directional circular polarizer being located between said transflector and said first side of said layer of chiral nematic liquid crystal material; and a light source located behind said transflector proximal to said light transmitting side and distal to said light reflecting side.

* * * * *

UNITED STATES PATENT AND TRADEMARK OFFICE
CERTIFICATE OF CORRECTION

PATENT NO. : 7,009,666 B2 Page 1 of 1
APPLICATION NO. : 09/961441
DATED : March 7, 2006
INVENTOR(S) : Asad A. Khan et al.

It is certified that error appears in the above-identified patent and that said Letters Patent is hereby corrected as shown below:

On the cover page, Item (56), References Cited, U.S. Patent Documents, please add:

--6,344,887    2/2002    Ma et al.--

On the cover page, Item (56), References Cited, Other Publications, please add:

--A. Khan et al., P-49: *Characterization of the Helical-Axis Distribution in Reflective Cholesteric LCD's*, Proc. of SID 96, 607 (1996).--

Column 12, line 39, please delete "($C_{3OSRU-P}$)", and insert therefor --($C3_{OSRU-P}$)--.

Column 12, line 48, please delete "$C^1_{BSR}$", and insert therefor --$C1_{BSR}$--.

Column 12, line 63, please delete "($C3_{OSRU-F, C3OSRD-F}$)", and insert therefor --($C3_{OSRU-F}$, $C3_{OSRD-F}$)--.

Signed and Sealed this

Fourteenth Day of August, 2007

JON W. DUDAS
*Director of the United States Patent and Trademark Office*